INVENTOR
FRANK J. SORDELLO

BY George E. Roth

ATTORNEY

United States Patent Office 3,533,009
Patented Oct. 6, 1970

3,533,009
DUAL SERVO LOOP OSCILLATOR FREQUENCY SYNCHRONIZING CIRCUITRY

Frank John Sordello, San Jose, Calif., assignor to International Business Machines Corporation, Armonk, N.Y., a corporation of New York
Filed Nov. 15, 1968, Ser. No. 776,112
Int. Cl. H03b 3/04
U.S. Cl. 331—2 10 Claims

ABSTRACT OF THE DISCLOSURE

A square wave voltage controlled oscillator is locked in frequency synchronism with square wave voltage from another oscillator (or other source of primary square wave oscillations) in a circuit arrangement comprising two closed servo loop circuits individual to the sources of oscillations and connected in common with a secondary reference time period metering circuit. The latter is a voltage variable single-shot circuit (monostable reciproconductive circuit). The square wave oscillations are differentiated and the resulting trains of sharp pulses are applied alternately to the single-shot circuit to trigger it to the unstable state. The primary servo loop circuit is enabled first to adjust the time period of the unstable state of the secondary reference circuit to that of the primary oscillation. The secondary servo loop circuit is thereafter enabled to adjust the time period of the voltage controlled oscillator to that of the adjusted secondary reference circuit. The voltage controlled oscillator is a free running multivibrator (or astable reciproconductive circuit) of circuitry effecting a change in the period with a change in applied control voltage. Within a few cycles the time periods of the primary oscillations, the secondary reference circuit and the oscillator are the same and the corresponding circuits are locked in frequency synchronism despite any irregularities in the initial starting phase of the ocsillations. Logical circuitry is arranged to gate the waves alternately in response to the operation of a triggered multivibrator (or binary reciproconductive circuit) switched by the secondary single-shot circuit. One set of AND gating circuits is arranged to gate the differentiated waves to the secondary single-shot circuit and two other sets of AND gating circuits are arranged for determining the overlap of the pertinent waves developed for generating the adjusting or control voltages in voltage ramping, integrating and holding circuits. This frequency synchronizing circuitry is particularly applicable to magnetic disk, drum, tape or magnetic strip digital data storage devices.

The invention evolves from the same general field of the digital data transfer art as that disclosed in the copending U.S. patent applications, Ser. No. 735,137 of Donald E. Anderson et al., filed on the 6th day of June 1968 for a "Phase Locked Oscillator for Storage Apparatus" and Ser. No. 754,883 of Carl P. Hollstein et al., filed on the 23rd day of August 1968, both assigned to the International Business Machines Corporation. Reference to these U.S. patent applications will be helpful in the understanding of the background of this invention.

The invention relates to oscillator synchronizing circuitry, and it particularly pertains to such circuitry for digital data translating systems incorporating a moving magnetic data storage disk, drum, tape, or magnetic strip; however, it is not limited to such apparatus.

In the contemporary magnetic storage art, attention is being directed to high density bit storage, especially in magnetic storage disks and drums. The development of such high density packing has reached the level where magnetically recorded clocking tracks and toothed mechanical timing rings are so difficult and expensive to make in the required accuracy that combinations of lower tolerance components and compensating circuitry has proven less costly and are also easier in adjustment and the like. One such arrangement is described in the above referenced U.S. patent application Ser. No. 735,137. This application describes a phase locked oscillator and its environment for generating a very accurate clocking pulse train for recording digital data directly by gating recording data pulses with derived clocking track pulses. Much better recording tolerances are afforded at lower cost with this arrangement and the subsequent reproducing of the stored data is also much better. However, variations in the recorded data are still such that in the reproducing mode there must be some allowance made in the apparatus at the cost of reducing the density of data that may be recorded. These allowances vary in the different apparatus, but there is a range of costs for each that may be balanced between the cost of the machine with a given density of packing and the cost of additional circuitry for economically achieving the desired results.

Of the many proposals which have been made for improving the apparatus, there are several based on the interposition of the combination of another oscillator and a related frequency and/or phase adjusting circuit arrangement between a source of timing oscillations used for the recording process and the data reproducing circuitry. The circuitry suitable for the purpose as found in the prior art is directed to digital servo synchronizing or clocking systems and component subsystems. Examples of this prior art are to be found in the following U.S. patents: 3,249,886, May 1966, Anderson et al.; 3,259,851, July 1966, Brauer; 3,333,205, July 1967, Featherston; 3,339,157, Aug. 1967, Fiorino; 3,368,037, Feb. 1968, MacGregor; and an article from the technical literature: R. A. Miller, IEEE Spectrum, "Digital Control of Shaft Speed and Position," January 1968, pp. 90–95.

This art is especially of interest in that the circuitry disclosed is based on some of the same circuit components that are used in the invention, such as logical AND and OR gating circuits, flip-flops, single-shot circuits, free running and triggered multivibrators, and the like.

Because of the gross inconsistency with which the terminology relating to the many types of "multivibrators" and similar circuits is used, the less frequently but much more consistently used term "reciproconductive circuit" will be substituted therefor hereinafter in the interest of clarity. As employed herein, the term "reciproconductive circuit" is construed to include all dual current flow path element regenerative circuit arrangements in which current alternates in one and then the other of those elements in response to applied triggering pulses. The term "free running multivibrator" is sometimes applied to the "astable reciproconductive circuit" which is one in which conduction continuously alternates between the elements after the application of a single triggering pulse (which may be merely an electric impulse resulting from closing a switch for energizing the circuit). Such a circuit oscillates continuously at a rate dependent on the time constants of various components of the circuit arrangement and/or the applied energizing voltage. The term "monostable reciproconductive circuit" will be used to indicate such a circuit in which a single trigger is applied to a single input terminal to trigger the reciproconductive circuit to the unstable state once and return. This monostable version is sometimes called a "single-shot circuit" in the vernacular principally because of the erosion of the original term "flip-flop" and because it is shorter than the term "self-restoring flip-flop circuit" later used in an attempt to more clearly distinguish from the term "bistable flip-flop circuit" even more lately in vogue. "Bistable reciproconductive circuits" are divided into the "binary reciproconductive circuit" which has a single input terminal to which triggering pulses are applied to alternate the state of conduction each time a pulse is applied. Such a circuit is now frequently referred to as a "binary flip-flop." The "bistable reciproconductive circuit" having two input terminals between which successive triggers must be alternately applied to switch from one stable state to the other will be referred to as a "bilateral reciproconductive circuit." This version is presently familiarly called both a "flip-flop" and a "lockover circuit."

According to the invention, the objects indirectly referred to hereinbefore and those which will appear as the specification progresses are obtained in frequency synchronizing circuitry for locking a square wave voltage controlled oscillator in frequency synchronism with a square wave voltage from another oscillator or other source of primary square wave oscillations independently of phase relationships. Two closed loop servo circuits individual to the source of oscillations are connected in common to an electronic chronometer in the form of a variable reference square wave time period metering circuit. First, the primary servo loop circuit is enabled to adjust the time period of the secondary reference variable time period metering circuit to that of the oscillations from the primary oscillator. Then, the secondary servo loop circuit is enabled to adjust the time period of the voltage controlled oscillator to that of the adjusted secondary reference time period metering circuit. Within a few cycles of transient response, the time periods of the oscillators and the metering circuit are locked in frequency synchronism (but not necessarily phase synchronism) despite any irregularities in waveform.

The secondary reference time period metering circuit is a voltage variable monostable reciproconductive circuit. The square waves from the two oscillators are differentiated and the resulting sharp pulses are applied alternatively to the monostable reciproconductive circuit to trigger it to the unstable state. The voltage controlled oscillator is an astable reciproconductive circuit capable of exhibiting a change in the period with a change in applied control voltage.

A binary reciproconductive circuit is triggered by the monostable reciproconductive circuit switching to the unstable state. This binary reciproconductive circuit is effective to switch one set of AND gating circuits for gating the differentiated waves to the secondary reference metering monostable reciproconductive circuit, and two other sets of AND gating circuits for comparing the overlap of the developed waves and controlling the development of adjusting voltage in voltage ramping, integrating and holding circuits.

In order that the advantages of the invention may be readily attained in practice, a description of a preferred embodiment of the invention is given hereinafter, by way of example only, with reference to the accompanying drawing forming a part of the specification and in which.

Figure 1:
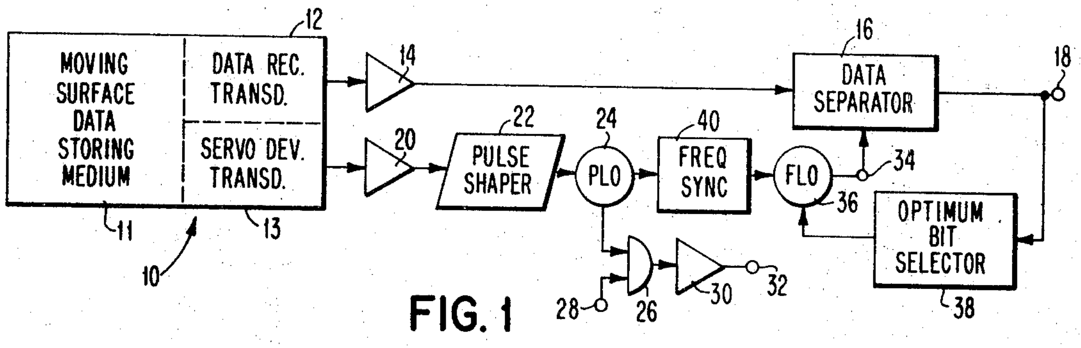
FIG. 1 is a functional diagram of circuitry according to the invention in one exemplary environment.

Frequency synchronizing circuitry according to the invention is shown in an exemplary embodiment of a digital data transferring system by the functional diagram of FIG. 1. A digital data storage 10 comprises a moving surface data storing medium 11 which may be apparatus in the form of magnetic tape, or magnetic disk or drum. The data storage 10, of course, is interconnected with a large number of components; however, only the essential components are shown here in the interest of clarity. A data record transducer 12 forms a part of the apparatus 10 for translating data to and from the moving surface data storing medium 11. A servo device transducer 13 is arranged for developing a digital clock pulse train from the storage 10. In the data reproducing mode the data record transducer 12 is coupled to an amplifier 14 for translating the signal to a data separator 16 from which the separated data is delivered at output terminals 18. The servo device transducer 13 is, for example, an electromagnetic transducer arranged to read a clock track magnetically recorded on the storing medium 11 or one arranged to develop a similar pulse train in response to the passage of lands and grooves of a toothed mechanical timing device coupled to the moving storing medium 11. A timing pulse train from the transducer 13 is applied through an amplifier 20 to a pulse shaper 22 from which essentially square wave voltage output is applied to a phase locked oscillator 24. One function of the phase locked oscillator 24 is to develop a gating wave for the data recording operation. This gating wave is applied to an AND gating circuit 26 to which the digital data to be recorded is applied at input terminals 28. The output of the AND gating circuit 26 is applied through an amplifier 30 to output terminals 32. At the latter terminals 32 recording data is available for application through circuitry not shown for recording information in a data record on the moving surface data storing medium 11. It is common practice to couple the data terminals 32 to the data record transducer 12 after disconnecting the latter from the reproducing mode amplifier 14.

Timing waves for the data separator 16 are applied at terminals 34. These timing waves are generated in a frequency-locked oscillator 36 under the control of an optimum bit selector 38 and a frequency synchronizing circuit 40 according to the invention. The latter serves to lock the oscillator 36 and the phase locked oscillator 24 in frequency synchronism after which the optimum bit selector 38 adjusts the phase of the frequency locked oscillator 36 so that each multi-bit data word is separated according to the bit which has received the least bit shift in the transducing process. Such an optimum bit selector, for example, may be merely a reference flag bit selecting circuit according to known art, and the optimum bit selector circuitry will not be further described here as it forms no part of the invention in and of itself.

Figure 2:
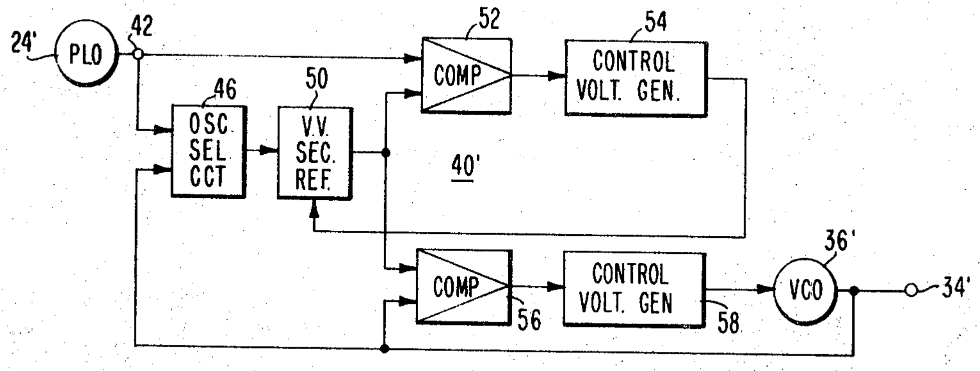
FIG. 2 is a functional diagram of the dual servo loop oscillator frequency synchronizing circuit according to the invention.

FIG. 2 depicts a basic circuit arrangement according to the invention wherein two closed servo loop circuits are arranged for synchronizing the voltage controlled oscillator 36' in frequency with oscillations applied at input terminals 42. Such oscillations may emanate from a phase-locked oscillator 24' as shown. The primary closed servo loop circuits comprises the terminal 42 at which a substantially square wave voltage appears, an oscillation selecting circuit 46, an electronic chronometer or voltage variable secondary reference time period metering circuit 50, a logical frequency comparing circuit 52, and a control voltage generator 54 which has a lead applying a time period adjusting voltage to the secondary reference circuit 50 to complete the loop circuit. In operation this primary loop circuit compares the time period of the voltage wave at the input terminals 42 with the time period of the voltage wave at the output terminals of the secondary reference circuit 50 and generates an "Error Correcting" adjusting voltage which brings the secondary reference circuit 50 into substantial frequency synchronism with the oscillations appearing at the input terminals 42. Thereafter, the oscillation selection circuit 46 accepts the substantially square wave voltage appearing at the output of a voltage controlled oscillator 36' for application to the voltage variable secondary reference circuit 50 for comparing the time period of the output thereof with the time period of the output of the voltage controlled oscillator 36' in a comparison circuit 56 which is effective to enable the control voltage generator 58 to deliver a control voltage to the voltage controlled oscillator 36' to bring it into frequency synchronism with the voltage variable secondary reference circuit 50. In this manner, the voltage wave appearing at the output terminal 34' is in frequency synchronism with the voltage applied at the input terminals 42 despite any considerable difference in the purity of waveform or phase difference.

Figure 3:
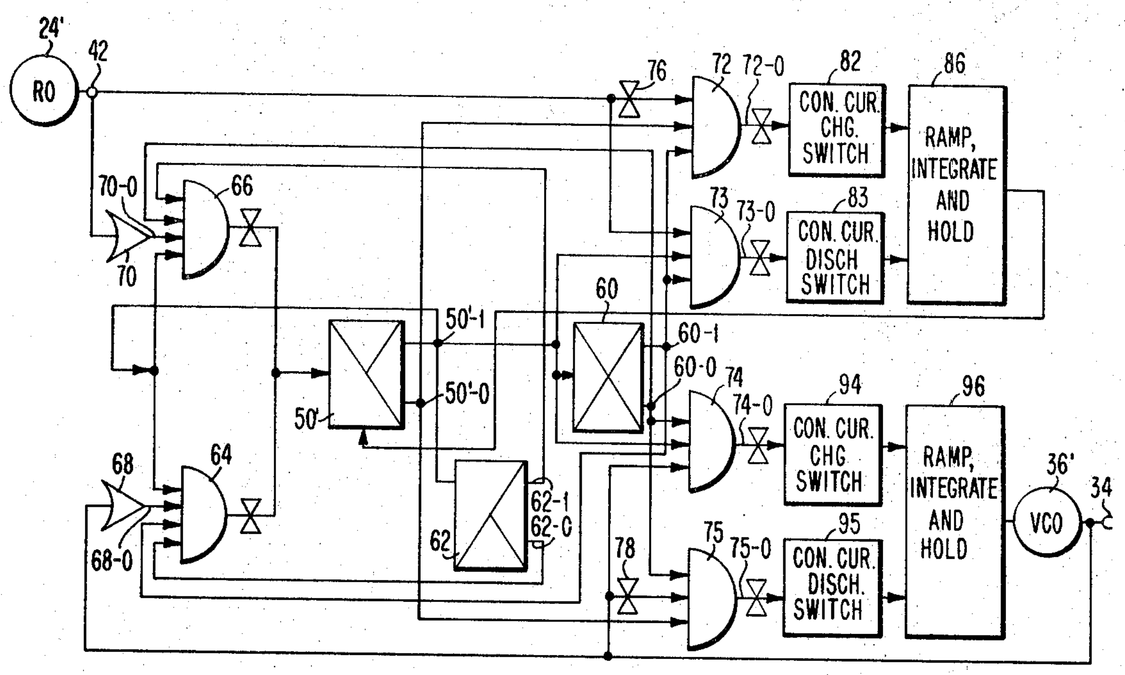
FIG. 3 is a logical circuit diagram of a circuit based on that illustrated in FIG. 2.

FIG. 3 is a logical circuit diagram of one embodiment of the invention for performing the function outlined in FIG. 2. The voltage variable secondary reference time period metering circuit comprises a monostable voltage variable reciproconductive circuit 50'. A binary reciproconductive circuit 60 is arranged to be triggered by switching of the monostable reciproconductive circuit 50' for first enabling the primary closed servo loop and then for enabling the secondary servo loop on the succeeding cycle. The invention is described for clarity in forms of electric components having no substantial circuit time delays. It should be understood by those skilled in the art that such circuit delays are readily accounted for in the design of such logical circuitry. The circuit 50' actually is effective on the trailing edges of the waves rather than on the leading edges as expected at first glance, preferably, therefore, another monostable reciproconductive circuit 62 having a fixed time constant is interposed in the circuit to be triggered by the secondary reference frequency oscillator 50' for insuring that there is no overlap in operation of the two closed servo loop circuits. A pair of AND gating circuits 64 and 66 form oscillation selecting circuitry under the control of the binary reciproconductive circuit 60. Substantially square wave voltages are applied to the AND gating circuits from the output circuits of the voltage variable secondary frequency reference oscillator 50', the binary reciproconductive circuit 60, and the monostable reciproconductive circuit 62. These square waves bring the AND gating circuits to levels for selecting the oscillations. The secondary reference circuit 50 is triggered by sharp pulses also applied to the AND gating circuits 64 and 66. These triggering pulses are derived by differentiating circuits 68 and 70 to which the square wave output of the voltage controlled oscillator 36' and the primary square wave oscillations at terminal 42 are individually applied.

The binary reciproconductive circuit 60 is also used to control two pairs of AND gating circuits 72, 73 and 74, 75 forming the comparing circuitry of the two closed loop servo circuits. Positive and negative pulse trains at the outputs of the monostable reciproconductive circuit 50' and the binary reciproconductive circuit 60 are applied to these AND gating circuits for controlling their operation. A substantially square wave voltage appearing at input terminal 42 is applied directly to the AND gating circuit 73 and the inverse wave of that voltage is applied to the AND gating circuit 72 by means of an inverting circuit 76. Likewise, the square wave voltage at the output of the voltage controlled oscillator 36' is applied directly to the AND gating circuit 74 while the inverse of this wave is applied to the AND gating circuit 75 by means of another inverting circuit 78. With this logical circuit arrangement, the AND gating circuits are enabled in response to the overlap of the various waveforms in one AND gating circuit.

It should be noted in passing that each of the AND gating circuits are shown followed by inverting circuits because logical AND gating circuits delivering an inverted output are more readily available commercially. However, it should be clearly understood that those skilled in the art may readily adapt non-inverting AND gating circuits in a logical circuit arrangement equivalent to the one shown if such is desirable.

Figure 5:
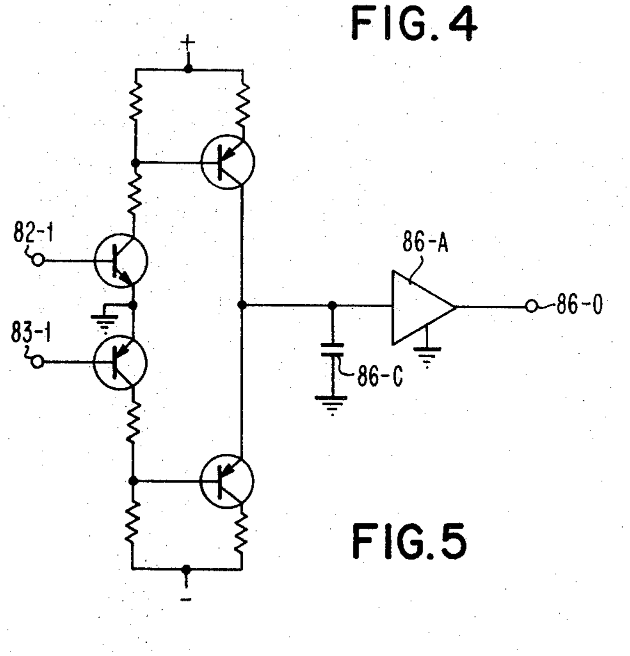
FIG. 5 is a schematic diagram of a voltage ramping, integrating and holding circuit useful in the practice of the invention.

The outputs of each of the AND gating circuits 72, 73 and 74, 75 are applied to separate but at least similar adjusting voltage generating circuits in each closed servo loop. For the primary servo loop there is a constant current charging circuit 82, a constant current discharging circuit 83, and a ramping voltage integrating and holding circuit 86, and for the secondary servo loop there are similar circuits 94, 95 and 96, respectively. These voltage ramping, integrating and holding circuits are known to the art; an example is given in FIG. 5. For use as the circuitry for the component 82, 83 and 86, a voltage positive-going with respect to ground is applied at the input terminals 82–1 to increase the voltage stored in a capacitor 86–C. A voltage negative-going with respect to ground at the other input terminals 83–1 is applied to decrease the voltage in the capacitor 86–C. The transistors function in switching and in constant current generating modes. The amplfiier circuit 86–A primarily performs an isolating function. It should have a relatively high impedance input circuit so that the charge on the capacitor 86–C is not bled off. The output impedance may be low as it is connected into the energizing circuitry of the reciproconductive circuit 50'. Similar considerations apply to circuitry for the components 94, 95 and 96. These circuits are arranged for storing a charge in the capacitive element which varies in time as a ramp voltage for converting time difference into voltage level, which integrates the previous difference voltages of the loop circuit, positively and/or negatively, and which holds the resultant sum voltage for rendering the adjusting voltage substantially continuous between cycles of operation. The above mentioned copending U.S. patent application Ser. No. 735,137 shows and describes simple capacitor type integrating circuitry, while the copending U.S. patent application Ser. No. 754,883 is directed to an improved circuit for the purpose.

Figure 4:
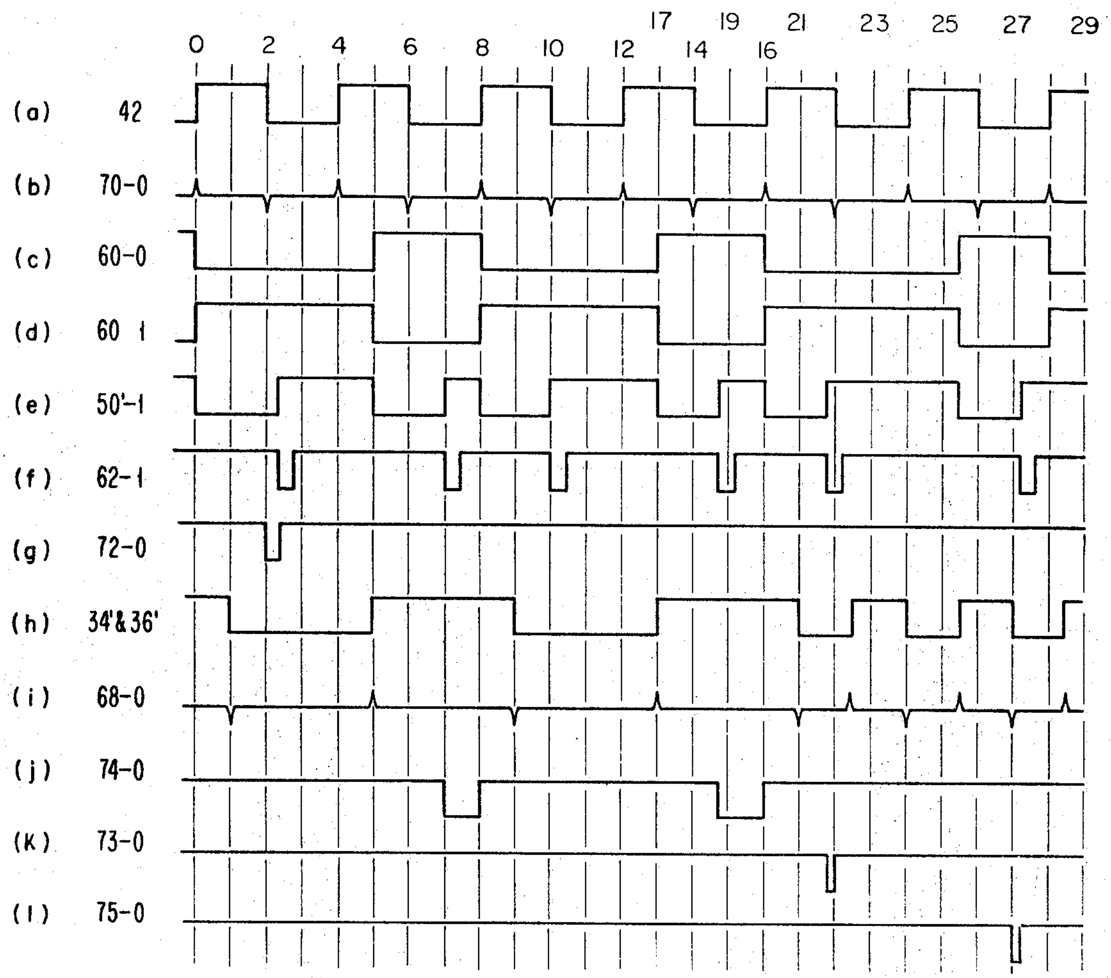
FIG. 4 is a graphical representation of waveforms developed with the logical circuit arrangement shown in FIG. 3.

The operation of the circuitry of FIG. 3 will be more readily appreciated by comparing graphical representations of the waveforms generated. It should be understood that the waveforms as shown in FIG. 4 are composites of four different sets of waveforms for the four different modes of correction in achieving the desired synchronization. It will be helpful in the understanding of the circuit operation to divide the curves in two overlapping groups: one group betwen the vertical grid dashes 0–16 and the other between the dashes 17–29 as numbered at the top of the grid. Curve 4($a$) is a graphical representation of a voltage waveform at the input terminals 42. That waveform after passing through the differentiating circuit 70 is represented by the curve 4($b$). The complementary curves 4($c$) and 4($d$) represent the waveform at the terminals 60–0 and 60–1 of the binary reciproconductive circuit 60 in response to triggering by the output of the secondary reference oscillator 50' at the output terminals 50'–1. The same wave is arranged to trigger the reset monostable reciproconductive circuit 62 for generating a wave represented by the curve 4($f$) obtained at the output terminals 62–1. The waveform at the output terminal 72–0 is represented by the curve 4($g$) which, in turn, represents a condition calling for the increase in repetition rate of the monostable reciproconductive circuit 50'. An example of a waveform from the output of the voltage controlled oscillator 36' as it undergoes synchronization with the primary wave at the input terminals 42 is represented by the curve 4($h$). The curve 4($i$) represents the latter wave after subjection to the differentiating circuit 68. Pulses appearing at the output terminals 74–0, 73–0 and 75–0 are represented by the curves 4($j$), 4($k$) and 4($l$), respectively. These curves represent conditions for increasing the repetition rate of the voltage controlled oscillator 36', and for decreasing the repetition rate of the secondary reference reciproconductive circuit 50' and the voltage controlled oscillator 36', respectively.

While the invention has been described in terms of a preferred embodiment, it should be clearly understood that those skilled in the art will make changes in form and material without departing from the spirit and scope of the invention.

The invention claimed is:

1. Circuitry for locking an electric oscillator constituting a source of oscillations in frequency synchronism with given electric oscillations from another source comprising, a secondary reference time period metering circuit having an active period harmonically related to the time periods of said given oscillations and of the output oscillations of said oscillator and which is adjustable by application of a time period adjusting voltage, a pair of servo loop circuits individual to sources of said oscillations and common to said time period metering circuit, and control circuitry enabling said servo loop circuits alternately for generating an adjusting voltage for synchronizing said metering circuit with said given oscillations and for generating an adjusting voltage for said oscillator for synchronizing it with the adjusted metering circuit, thereby to synchronize said oscillator in frequency with said given oscillations.

2. Circuitry for locking an electric oscillator in frequency synchronism and with given electric oscillations as defined in claim 1 and wherein said secondary reference time period metering circuit is a voltage controlled monostable reciproconductive circuit.

3. Circuitry for locking an electric oscillator in frequency synchronism with given electric oscillations as defined in claim 1 and wherein each of said servo loop circuits includes a voltage ramping integrating and holding circuit for generating the corresponding adjusting voltage.

4. Circuitry for locking an electric oscillator in frequency synchronism with given electric oscillations as defined in claim 3 and wherein each of said adjusting voltage generating circuits comprise a charge storing element, a constant current charging circuit coupled to said charge storing element for increasing the charge stored therein, and constant current discharging circuit coupled to said charge storage element for decreasing the charge stored therein.

5. Circuitry for locking an electric oscillator in frequency synchronism with given electric oscillations as defined in claim 3 and wherein each of said servo loop circuits further includes a comparator circuit for determining the voltage to which said ramp voltage generating circuit in the same loop circuit rises.

6. Circuitry for locking an electric oscillator in frequency synchronism with given electric oscillations as defined in claim 2 and wherein said control circuitry includes a binary reciproconductive circuit coupled to said monostable reciproconductive circuit and responsive thereto for switching upon each cycle of operation of said monostable reciproconductive circuit.

7. Circuitry for locking an electric oscillator constituting a source of oscillation in frequency synchronism with given electric oscillations from another source as defined in claim 6 and wherein each servo loop circuit comprises an AND gating circuit having an output terminal coupled to said voltage controlled monostable reciproconductive circuit, an input terminal coupled to an output terminal of said voltage controlled monostable reciproconductive circuit, another input terminal coupled to an output terminal of said binary reciproconductive circuit, and a further input terminal coupled to one of the sources of said oscillations.

8. Circuitry for locking an electric oscillator in frequency synchronism with given electric oscillations as defined in claim 7 and wherein a differentiating circuit is interposed between said one of said sources of oscillations and said further input terminal of said AND gating circuit.

9. Circuitry for locking an electric oscillator in frequency synchronism with given electric oscillations as defined in claim 7 and wherein said AND gating circuit comprises an additional input terminal and an additional monostable reciproconductive circuit coupled between said additional input terminal and an output terminal of said voltage controlled monostable reciproconductive circuit.

10. Circuitry for locking an electric oscillator constituting a source of oscillation in frequency synchronism with given electric oscillations from another source as defined in claim 6 and wherein each servo loop circuit comprises a charge storing element, a charge varying circuit interposed between each of said AND gating circuit output terminals and said charge storing element, a pair of AND gating circuits each having an output terminal coupled to said charge storage element, one input terminal coupled to one of said sources of oscillations, another input terminal coupled to an output terminal of said voltage controlled monostable reciproconductive circuit, and further input terminal coupled to an output terminal of said binary reciproconductive circuit.

No references cited.

JOHN KOMINSKI, Primary Examiner

U.S. Cl. X.R.

331—14, 17